(12) United States Patent
Kuepper et al.

(10) Patent No.: US 9,857,043 B2
(45) Date of Patent: Jan. 2, 2018

(54) LED H4 RETROFIT LAMP UNIT

(71) Applicant: KONINKLIJKE PHILIPS N.V., Eindhoven (NL)

(72) Inventors: Lukas Kuepper, San Jose, CA (US); Nadin Roesler, San Jose, CA (US)

(73) Assignee: Koninklijke Philips N.V., Eindhoven (NL)

( * ) Notice: Subject to any disclaimer, the term of this patent is extended or adjusted under 35 U.S.C. 154(b) by 122 days.

(21) Appl. No.: 14/901,061

(22) PCT Filed: Jun. 18, 2014

(86) PCT No.: PCT/EP2014/062782
§ 371 (c)(1),
(2) Date: Dec. 27, 2015

(87) PCT Pub. No.: WO2014/206821
PCT Pub. Date: Dec. 31, 2014

(65) Prior Publication Data
US 2016/0169466 A1 Jun. 16, 2016

(30) Foreign Application Priority Data
Jun. 27, 2013 (EP) .................................... 13173998

(51) Int. Cl.
*F21S 8/10* (2006.01)
*F21K 9/232* (2016.01)
*F21W 101/10* (2006.01)

(52) U.S. Cl.
CPC ........... *F21S 48/1159* (2013.01); *F21K 9/232* (2016.08); *F21S 48/328* (2013.01); *F21W 2101/10* (2013.01); *Y02B 20/383* (2013.01)

(58) Field of Classification Search
CPC ..... F21S 48/1159; F21S 48/328; F21K 9/232; Y02B 20/383; F21W 2101/10
See application file for complete search history.

(56) References Cited

U.S. PATENT DOCUMENTS 7,824,076 B2 11/2010 Koester
2002/0039289 A1 4/2002 Kinouchi
(Continued)

FOREIGN PATENT DOCUMENTS

CN 200972620 Y 11/2007
DE 102007044628 A1 * 4/2009 ............ F21S 48/115
(Continued)

OTHER PUBLICATIONS

EPO Application No. 13173998.9, filed Jun. 27, 2013, "Extended EP Search Report", dated Nov. 15, 2013, 8 pages.
(Continued)

*Primary Examiner* — David V Bruce

(57) ABSTRACT

The present invention relates to a LED lamp unit replacing an H4 bulb in a headlamp. The LED lamp unit (2) at least comprises two LED light sources (5) arranged on two opposing sides of a support member (11) to emit in opposed half-spaces, a heat sink (12, 3) and an electrical connector socket. The electrical connector socket is designed to fit in a lamp holder of a H4 headlamp such that the plane (6) separating the opposed half-spaces is tilted around the optical axis (7) of the headlamp by an angle of between 5° and 30° against the horizontal plane when the connector socket is mounted in the lamp holder. The proposed LED lamp unit replaces H4 bulbs in H4 headlamps and achieves the required legal beam pattern without changing the optical design of the headlamp.

11 Claims, 3 Drawing Sheets

(56) References Cited

U.S. PATENT DOCUMENTS

2008/0123360 A1 5/2008 Matsumoto
2009/0002997 A1 1/2009 Koester

FOREIGN PATENT DOCUMENTS

DE 102011007123 A1 10/2012
TW 200918812 A 5/2009

OTHER PUBLICATIONS

EPO as ISA for PCT/EP2014/062782, filed Jun. 18, 2014, "International Search Report and Written Opinion", dated Aug. 4, 2014, 12 pages.
First Office Action dated Apr. 19, 2017, China Patent Application No. 201480036596.9, 20 pages.

* cited by examiner

LED H4 RETROFIT LAMP UNIT

CROSS-REFERENCE TO RELATED APPLICATIONS

The present application is a §371 application of International Application No. PCT/EP2014/062782 filed on Jun. 18, 2014 and titled "LED H4 Retrofit Lamp Unit," which claims the benefit of EP Application No. 13173998.9, filed Jun. 27, 2013. Both PCT/EP2014/062782 and EP 13173998.9 are incorporated herein.

TECHNICAL FIELD AND BACKGROUND OF THE INVENTION

The present invention relates to a LED lamp unit comprising at least two LED light sources arranged on two opposing sides of a support member to emit in opposed half-spaces, a heat sink in thermal contact with said support member of the LED light sources and an electrical connector socket for electrically connecting the LED light sources. The invention also relates to a headlamp at least comprising a reflector, a H4 lamp holder and such a LED lamp unit.

Automotive H4 halogen bulbs provide low and high beam from a single light source having two filaments. The corresponding headlamp is designed to provide a low beam reflector and a high beam reflector as well as the corresponding lamp holder for mounting the H4 bulb in the appropriate position and orientation. Due to the cost efficient H4 headlamp concept this technology is still the most popular light sources technology for low and medium car segments.

The main drawback of halogen bulb technology is its inefficiency and limited lifetime. Additionally it is often extremely difficult to exchange the bulb without the help of a garage. In order to provide an acceptable light distribution which is compliant to the corresponding legal regulations a H4 bulb requires a power of 60 W to generate a flux of 1000 lumen. The corresponding typical lifetime is on the order of 500 hours.

On the other hand LED technology is much more energy efficient and provides a lifetime which is equal to a car life. A few years ago the first Full-LED-headlamps were launched mainly in the high end car segments. All these headlamps had to be equipped with optics which are optimized to the corresponding LED light emission pattern in order to fulfill the legal beam pattern requirement.

It is desirable to provide so called LED retrofits which may simply replace the known H4 halogen bulbs in an automotive headlamp without any change in the design of the optics of the headlamp. At present LED retrofits for nearly every automotive halogen bulb type a available in the market which fit into the corresponding lamp holder of the halogen headlamps. These commercially available LED retrofits however, at least in case of H4 LED retrofits, provide excessive glare and only 10% of the illumination values required for a legal beam pattern.

Such H4 retrofit LED lamp is for instance disclosed in DE 10 2007 044 628. The retrofit LED lamp is provided with LED light sources arranged on two opposing sides of a support member and may emit light in two opposing half-spaces. Also thermal conducting elements are provided. The retrofit LED lamp is further provided with a connector for mounting the lamp in the holder of a headlamp.

The known H4 retrofit LED lamps do not fulfill the legal beam pattern requirement without a change of the optics of the headlamp.

SUMMARY OF THE INVENTION

It is an object of the present invention to provide a LED H4 retrofit lamp unit which fulfills the legal beam pattern requirement without any design change of the optics of the headlamp.

The object is achieved with the LED lamp unit according to claim 1. Claim 7 relates to a corresponding headlamp including a LED lamp unit. Advantageous embodiments of the LED lamp unit and headlamp are subject matter of the dependent claims or are disclosed in the subsequent portions of the description and preferred embodiment.

The proposed LED lamp unit at least comprises two LED light sources arranged on two opposing sides of a support member to emit in opposed half-spaces, a heat sink in thermal contact with the support member of the LED light sources and an electrical connector socket for electrically connecting the LED light sources. Preferably the heat sink is also in thermal contact with connector socket. Furthermore, one or several fans may be attached to the heat sink. The electrical connector socket for electrical connecting the LED light sources is designed to fit in a lamp holder of a H4 headlamp. In order to fulfill the legal beam pattern requirements when mounted in such a headlamp, the electrical connector socket is designed such that the plane separating the opposed half-spaces is tilted around the optical axis of the headlamp or headlamp reflector by an angle of between 5° and 30° against the horizontal plane when the connector socket is correctly mounted in the lamp holder.

By this tilting of the plane separating the two opposed half-spaces against the horizontal in a headlamp, the legal beam pattern is achieved without any further adaptation of the optics of the headlamp. The plane separating the two half-spaces is typically the symmetry plane between the LED light sources mounted on one side of the support member and the LED light sources mounted on the other, opposing side of the support member. In case of a plate-like support member, this plane coincides with the symmetry plane of the plate-like support member.

In order to avoid glare, appropriate glare shields may be arranged on the LED lamp unit. Such glare shields then avoid that light emitted from the LED light sources on the lower side of the support member impinges on the low beam reflector portion and that light emitted from the LED light sources arranged on the upper side of the support member impinges on the high beam reflector portion. The upper and lower sides of the support member refer to the position of the two sides of the support member when the lamp unit is correctly mounted in the headlamp.

In a preferred embodiment, the electrical connector socket is designed such that the plane separating the opposed half-spaces is additionally tilted downwards from the horizontal plane including the optical axis of the headlamp by an angle of between 1° and 10° when the connector socket is mounted in the lamp holder. The tilting direction is such that the plane intersects the emission face of the headlamp at a position lower than the optical axis. With such an additional tilting it has been discovered that the light intensity in the distance area, i.e., in a distance of between 20 m to 80 m from the headlamp, in most known H4 headlamps is increased significantly.

In order to achieve the above tilting of the plane separating the opposed half-spaces, the lamp socket has to be appropriately oriented in the lamp unit with respect to the support member carrying the LED light sources. Since the lamp socket can only be mounted in the lamp holder of a H4 headlamp in one single defined position and orientation, the tilting is then automatically achieved when correctly mounting the LED lamp unit in the headlamp.

In the proposed LED lamp unit, in the following also called LED H4 retrofit lamp unit, preferably in maximum 6 LEDs for generating the low beam pattern are arranged on the upper side of the support member and in maximum 6 LEDs for generating the high beam pattern are arranged at the lower side of the support member. In a preferred configuration an array of LEDs forms the low beam configuration and another array of LEDs forms the high beam configuration. The number of LEDs in each array may vary.

The corresponding headlamp including such a LED lamp unit comprises at least a reflector, a H4 lamp holder and the LED lamp unit. Although the LED lamp unit is preferably designed such that the above tilting angle is achieved when mounting the LED lamp unit in the H4 lamp holder of a H4 headlamp, it would also be possible to adapt the lamp holder in such a headlamp to achieve the desired tilting angle with a LED lamp unit which is not specially designed to achieve such an angle. This means that the LED lamp unit at least comprises two LED light sources arranged on two opposing sides of a support member to emit in opposed half-spaces, a heat sink in thermal contact with the support member of the LED light sources and an electrical connector socket for electrical connecting the LED light sources which fits in the H4 lamp holder. The electrical connector socket in such a case may be designed without taking care of any tilting angle, e.g. without any tilting when mounted in a conventional headlamp. In such a case, the headlamp itself may be adapted by appropriately orienting the lamp holder in order to achieve the above tilting angle(s) when the LED lamp unit is mounted in the holder. Such an embodiment however requires a modification of the known H4 headlamps with respect to the spatial orientation of the lamp holder.

The construction of the LED lamp unit with LED light sources arranged on two opposing sides of a support member allows an illumination into both opposing half-spheres similar to the illumination of a H4 halogen bulb. With the arrangement of the heat sink on the side opposite to the electrical connection socket according to an embodiment of the invention, an elongated shape and dimensions similar to those of known H4 bulbs for automotive lamps are achieved. In a preferred embodiment, two separate heat sinks are arranged at two opposing edges of the support member in thermal contact with the support member. One of these heat sinks is thus arranged between the electrical connector socket and the support member. The heat sinks may comprise several cooling fins. In order to improve the cooling power, also an electrically operated fan can be arranged at one or both of the heat sinks such the fan generates a flow of cooling gas, in particular cooling air, through gaps between the cooling fins of the heat sink towards the LED light sources. Preferably the whole LED lamp unit has a dimension in a longitudinal direction, i.e. the direction between the connector socket and the heat sink, of less than 80 mm, more preferably of ≤50 mm, and a diameter perpendicular to this longitudinal direction of less than 20 mm, more preferably ≤15 mm.

BRIEF DESCRIPTION OF THE DRAWINGS

This and another aspects of the invention will be apparent from and elucidated with reference to the embodiment described herein after. In the drawings.

DETAILED DESCRIPTION OF EMBODIMENTS

Figure 1:
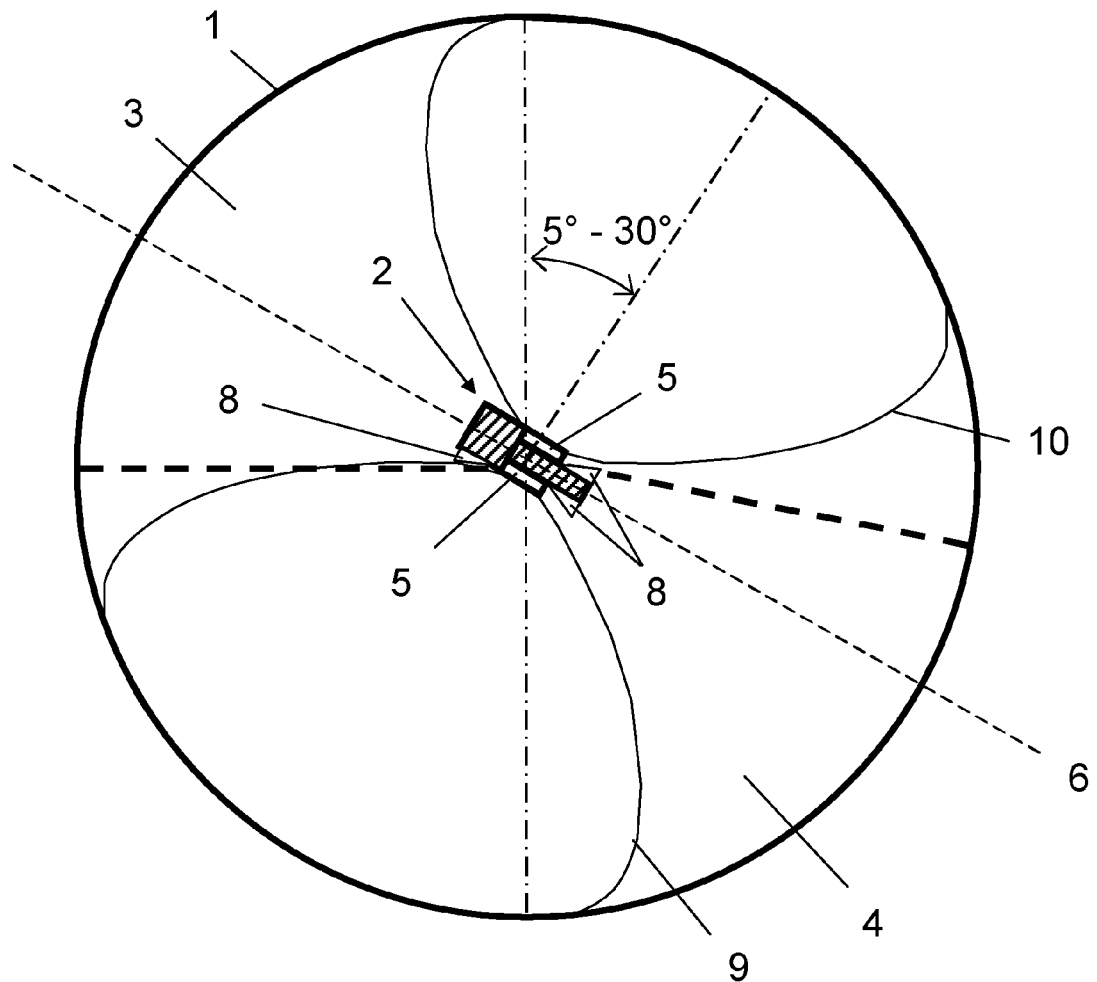
FIG. 1 shows a front view of a H4 reflector in which the proposed LED lamp unit according to an embodiment of the invention is mounted.

FIG. 1 shows a schematic front view of a H4 headlamp reflector 1 in which a LED lamp unit 2 according to an embodiment of the present invention is mounted. The reflector 1 comprises a low beam reflector portion 3 and a high beam reflector portion 4 separated by the dashed lines in the figure. The LED light sources 5 of the LED lamp unit arranged on two opposing sides of a support member are schematically indicated in the figure. The two opposing half-spaces, into which the LED light sources 5 emit, are separated by the indicated plane 6. As can be seen from the figure, this plane 6 is tilted by an angle of between 5° to 30° to the horizontal plane around the optical axis 7 of the headlamp. This optical axis 7 extends perpendicular to the paper plane at the center of the reflector 1. Additional glare shields 8 are arranged on the lamp unit in order to ensure that the light beam 9 emitted from the LEDs at the lower side of the support member only impinges on the high beam reflector portion 4 and that light beam 10 emitted from the LEDs arranged at the upper side of the support member only impinges on the low beam reflector portion 3.

Figure 2:
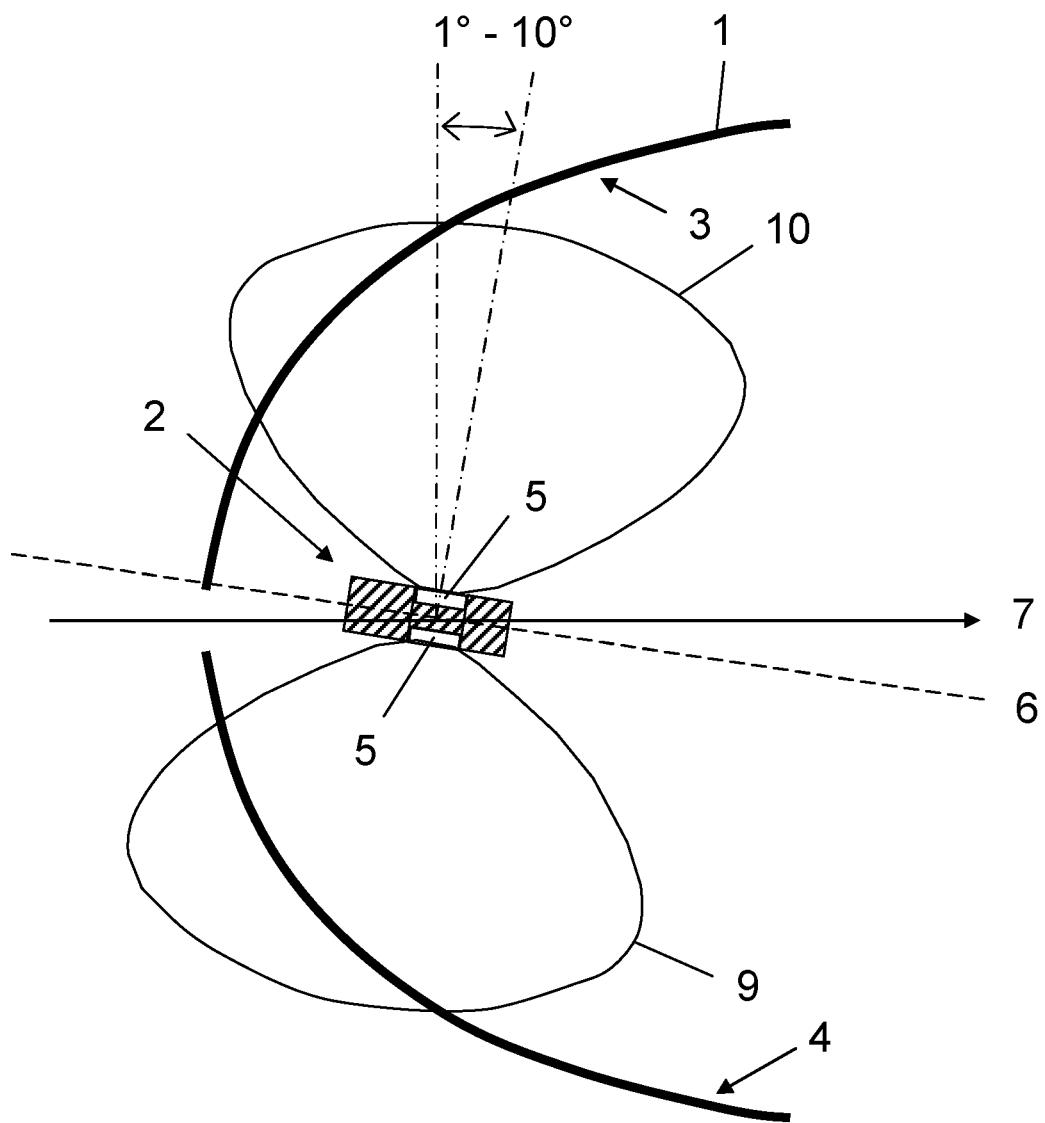
FIG. 2 shows a side view of the H4 reflector of FIG. 1 with the mounted LED lamp unit.

As can be seen from the side view shown in FIG. 2, the LED lamp unit 2 is additionally tilted by an angle of between 1° and 10° downwards against the horizontal plane including the optical axis 7. This significantly increases the intensity in the distance area in such a H4 headlamp.

Figure 3:
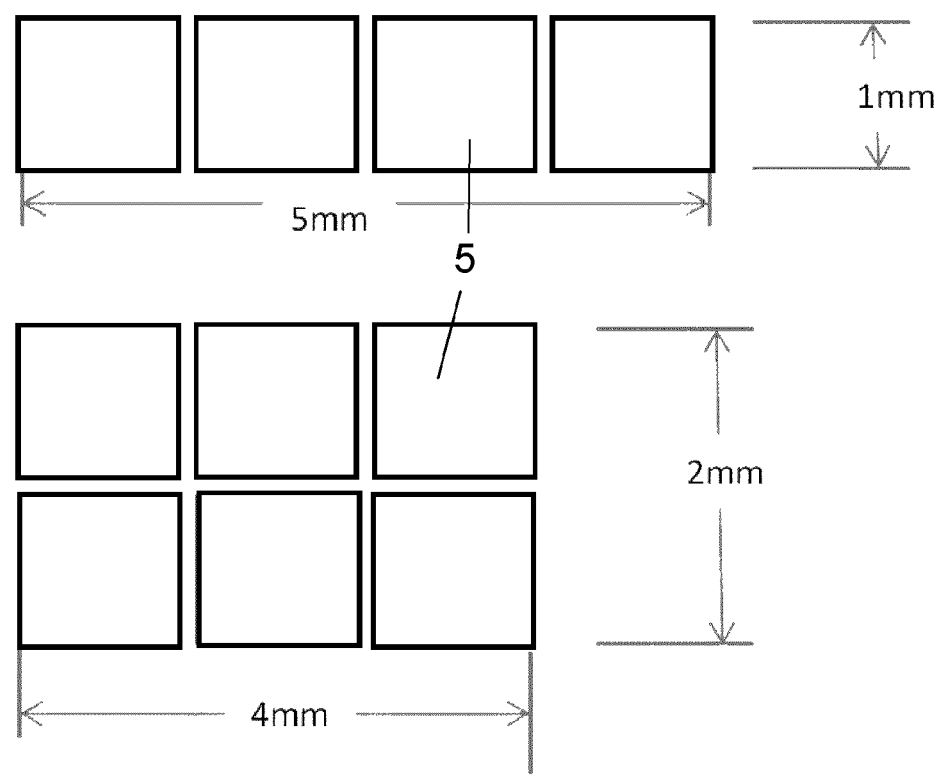
FIG. 3 shows an exemplary arrangement of the LED light sources on the lower side of the support member (3a) and of the LED light sources on the upper side of the support member (3b)

The proposed LED H4 retrofit lamp unit preferably comprises in maximum six LEDs, each having an emission area of approx. 1×1 mm$^2$, for generating the low beam pattern and in maximum six LEDs with the same emission area for generating the high beam pattern. FIG. 3a shows a preferred low beam LED configuration having four LEDs 5 arranged in a line and occupying an area of 5 mm in length and 1 mm in width. FIG. 3 b shows a preferred high beam LED configuration with a total of six LEDs 5 in two rows. The six LEDs occupy an area of 4 mm×2 mm as can be recognized in the figure.

Figure 4:
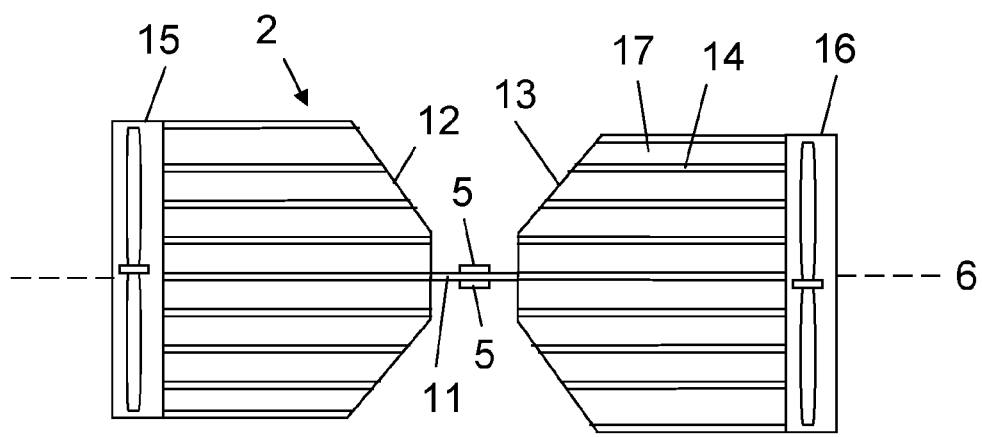
FIG. 4 shows a sectional view of an example of the LED lamp unit according to the invention.

FIG. 4 shows an example of a lamp unit according to the present invention in a sectional view. In this example the LED lamp unit 1 comprises the LEDs 5 mounted back to back on a thin metal plate representing the support member 11. The LEDs 5 emit in opposite directions or half-spaces. Two heat sinks 12, 13 are mounted perpendicular to the metal plate on opposite sides at the edges of the metal plate. The heat sinks 12, 13 comprise several cooling fins 14 extending between the LEDs 5 and the fans 15, 16 mounted at the back sides of the heat sinks 12, 13. Gaps 17 formed between the cooling fins 14 of the heat sinks 12, 13 are opened towards the fans 15, 16 and towards the LED light sources 5. With such an arrangement, a maximum cooling effect can be achieved by blowing air in opposite directions toward the LEDs 5. The heat sinks 12, 13 are tapered at their ends facing the LEDs 5 in order to achieve the emission of the LED light in a large solid angle. The electrical connections to the LEDs and the fans and the corresponding electrical connector socket are not shown in the figure. This electrical connector socket is arranged on one side of the lamp unit and is designed to fit in a corresponding H4 lamp holder and to achieve the desired tilting of the metal plate forming the support member 11 with respect to the horizontal plane when mounted in the lamp holder.

While the invention has been illustrated and described in detail in the drawings and forgoing description, such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims. The heat sinks may also be formed different than in the figure. Also the design of the lamp unit may substantially deviate from the example of FIG. 4. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. In particular, the features of claims 1 to 5 can be freely combined. Any reference signs in the claims should not be construed as limiting the scope of the claims.

LIST OF REFERENCE SIGNS 1 headlamp reflector
2 LED lamp unit
3 low beam reflector portion
4 high beam reflector portion
5 LEDs
6 plane separating opposing half-spaces
7 optical axis
8 glare shield
9 light beam
10 light beam
11 support member
12 heat sink
13 heat sink
14 cooling fin
15 fan
16 fan
17 gap

The invention claimed is:

1. A LED lamp unit suitable for use in a H4 headlamp for providing a low and a high beam, at least comprising:
   two LED light sources arranged on two opposing sides of a support member to emit in opposed half-spaces,
   a heat sink in thermal contact with said support member of the LED light sources, and
   an electrical connector socket for mounting the LED lamp unit in a lamp holder of the H4 headlamp,
   wherein, when the LED lamp unit is mounted in the H4 headlamp, a plane separating the opposed half-spaces is tilted around the optical axis of the H4 headlamp by an angle of between 5° and 30° against a horizontal portion of a border between a low beam reflector portion of the H4 headlamp and a high beam reflector portion of the H4 headlamp.

2. The LED lamp unit according to claim 1, wherein said electrical connector socket is designed and arranged such that, when the LED lamp unit is mounted in the H4 headlamp, the plane separating the opposed half-spaces is additionally tilted downwards from a horizontal plane including the optical axis of the H4 headlamp by an angle of between 1° and 10°.

3. The LED lamp unit according to claim 1, wherein, as seen when the LED lamp unit is mounted in the H4 headlamp, an array of LED light sources is arranged on the upper of the two opposing sides of the support member and another array of LED light sources is arranged on the lower of the two opposing sides of the support member.

4. The LED lamp unit according to claim 1, further comprising glare shields to avoid, when the LED lamp unit is mounted in the H4 headlamp,
   impinging of light of the LED light sources arranged on the lower of the two opposing sides of the support member on the low beam reflector portion of the H4 headlamp, and/or
   impinging of light of the LED light sources arranged on the upper of the two opposing sides of the support member on the high beam reflector portion of the H4 headlamp.

5. The LED lamp unit according to claim 1 or 2, wherein said support member is arranged between at least a portion of said heat sink and said electrical connector socket.

6. The LED lamp unit according to claim 5, wherein a second heat sink is arranged in thermal contact with the support member between the electrical connector socket and the support member.

7. A headlamp for providing a low and a high beam at least comprising a reflector, a H4 lamp holder and a LED lamp unit, said LED lamp unit at least comprising:
   two LED light sources arranged on two opposing sides of a support member to emit in opposed half-spaces,
   a heat sink in thermal contact with said support member of the LED light sources, and
   an electrical connector socket for electrically connecting the LED light sources, which LED lamp unit fits in said H4 lamp holder,
   wherein said LED lamp unit is mounted in said lamp holder such that a plane separating the opposed half-spaces is tilted around the optical axis of the headlamp by an angle of between 5° and 30° against a horizontal portion of a border between a low beam reflector portion of the reflector of the H4 headlamp and a high beam reflector portion of the reflector of the H4 headlamp.

8. The headlamp according to claim 7, wherein said LED lamp unit is mounted in said lamp holder such that the plane separating the opposed half-spaces is additionally tilted downwards from a horizontal plane including the optical axis of the headlamp by an angle of between 1° and 10°.

9. A LED lamp unit suitable for use in a H4 headlamp for providing a low and a high beam, at least comprising:
   two LED light sources arranged on two opposing sides of a support member to emit in opposed half-spaces,
   a heat sink in thermal contact with said support member of the LED light sources, and
   an electrical connector socket for mounting the LED lamp unit in a lamp holder of the H4 headlamp,
   wherein said electrical connector socket and said support member are arranged such that, when the LED lamp unit is mounted in the H4 headlamp, a plane separating the opposed half-spaces is tilted downwards by an angle of between 1° and 10° from a horizontal plane including an optical axis of the H4 headlamp.

10. The LED lamp unit according to claim 9, further comprising glare shields to avoid, when the LED lamp unit is mounted in the H4 headlamp, impinging of light of the LED light sources arranged on the lower of the two opposing sides of the support member on a low beam reflector portion of the H4 headlamp, and impinging of light of the LED light sources arranged on the upper of the two opposing sides of the support member on a high beam reflector portion of the H4 headlamp.

11. The LED lamp unit according to claim 10, wherein said electrical connector socket and said support member are further arranged such that, when the LED lamp unit is mounted in the H4 headlamp, the plane separating the opposed half-spaces is tilted around the optical axis of the H4 headlamp by an angle of between 5° and 30° against a horizontal portion of a border between the low beam reflector portion of the H4 headlamp and the high beam reflector portion of the H4 headlamp.

* * * * *